United States Patent
Figoureux et al.

(10) Patent No.: US 8,888,048 B2
(45) Date of Patent: Nov. 18, 2014

(54) REMOVABLE FASTENER DEVICE EQUIPPED WITH ATTACHMENT MEANS FOR ATTACHING AN EXTERNAL LOAD AND WITH FASTENER MEANS FOR FASTENING SAID ATTACHMENT MEANS TO AN AIRCRAFT, AN ASSOCIATED AIRCRAFT, AND AN ASSOCIATED METHOD

(75) Inventors: David Figoureux, Salon de Provence (FR); Christophe Gaillard, La Roque d'Antheron (FR); Florian Jimenez, Aix en Provence (FR); Eric Szymanski, Chateauneuf les Martigues (FR)

(73) Assignee: Airbus Helicopters, Marignane Cedex (FR)

( * ) Notice: Subject to any disclaimer, the term of this patent is extended or adjusted under 35 U.S.C. 154(b) by 344 days.

(21) Appl. No.: 13/353,449

(22) Filed: Jan. 19, 2012

(65) Prior Publication Data

US 2012/0193476 A1    Aug. 2, 2012

(30) Foreign Application Priority Data

Jan. 27, 2011    (FR) ..................................... 11 00243

(51) Int. Cl.
  *B64D 1/12* (2006.01)
  *B64D 1/22* (2006.01)
(52) U.S. Cl.
  CPC ........................................ *B64D 1/22* (2013.01)
  USPC .................. 244/137.4; 244/137.1; 244/118.1; 244/2; 244/3; 294/82.26; 294/82.29; 294/82.31
(58) Field of Classification Search
  USPC ........................ 244/137.1, 137.4, 118.1, 2, 3; 294/82.26, 82.29, 82.31
  See application file for complete search history.

(56) References Cited

U.S. PATENT DOCUMENTS

| | | | |
|---|---|---|---|
| 3,044,818 A | | 7/1962 | Tobey |
| 3,904,156 A | * | 9/1975 | Smith ......................... 244/118.1 |
| 4,138,078 A | | 2/1979 | Hester |
| 5,190,250 A | * | 3/1993 | DeLong et al. ............ 244/137.1 |

(Continued)

FOREIGN PATENT DOCUMENTS

| | | |
|---|---|---|
| CN | 1819948 A | 8/2006 |
| CN | 1891574 A | 1/2007 |

(Continued)

OTHER PUBLICATIONS

Search Report and Written Opinion; Application No. FR 1100243; dated Sep. 8, 2011.

(Continued)

*Primary Examiner* — Isam Alsomiri
*Assistant Examiner* — Assres H Woldemaryam
(74) *Attorney, Agent, or Firm* — Brooks Kushman P.C.

(57) ABSTRACT

A fastener device (10) provided with attachment means (20) for attaching an external load (5) and with fastener means (30) provided with a support beam (40) and with anchor means (50) for anchoring said support beam (40). A first mechanical coupling (60) connects said support beam (40) to the anchor means (50) so as to enable the support beam (40) to pivot about a first pivot axis (AX1). In addition, coupling means (70) are hinged to the support beam (40) so as to make pivoting possible about a second pivot axis (AX2), the attachment means (20) being hinged to the coupling means (70) to make pivoting possible about a third pivot axis (AX3). This fastener device (10) includes automatic folding means (100).

20 Claims, 5 Drawing Sheets

(56) References Cited

U.S. PATENT DOCUMENTS

| | | | | |
|---|---|---|---|---|
| 5,273,333 | A | * | 12/1993 | Hatfield et al. .............. 294/82.3 |
| 5,499,785 | A | * | 3/1996 | Roberts et al. ............ 244/137.4 |
| 5,562,394 | A | * | 10/1996 | Brown, Jr. ..................... 414/626 |
| 5,702,228 | A | * | 12/1997 | Tamai et al. ............... 414/744.5 |
| 5,836,548 | A | * | 11/1998 | Dietz et al. ................. 244/137.1 |
| 5,850,991 | A | * | 12/1998 | Hainsworth et al. ....... 244/137.1 |
| 5,932,829 | A | * | 8/1999 | Jakubowski, Jr. .............. 89/1.54 |
| 6,189,834 | B1 | * | 2/2001 | Dietz et al. ................. 244/137.1 |
| 7,413,140 | B2 | | 8/2008 | Bietenhader |
| 7,967,549 | B2 | * | 6/2011 | Geist et al. ................. 414/744.5 |
| 8,292,229 | B2 | | 10/2012 | Pancotti |
| 8,534,608 | B1 | * | 9/2013 | Cox, IV ..................... 244/137.4 |
| 2006/0249330 | A1 | | 11/2006 | Tardy |
| 2007/0006658 | A1 | * | 1/2007 | Kennedy et al. ................ 73/622 |
| 2008/0128548 | A1 | * | 6/2008 | Simkulet ......................... 244/87 |
| 2009/0287352 | A1 | * | 11/2009 | Geist et al. .................... 700/254 |

FOREIGN PATENT DOCUMENTS

| | | |
|---|---|---|
| CN | 101628624 A | 1/2010 |
| CN | 101758922 A | 6/2010 |
| FR | 1379420 A | 11/1964 |
| GB | 890178 A | 2/1962 |

OTHER PUBLICATIONS

Chinese Office Action Dated Dec. 31, 2013, Application No. 201210031197.6, Applicant Eurocopter, 5 pages.

* cited by examiner

REMOVABLE FASTENER DEVICE EQUIPPED WITH ATTACHMENT MEANS FOR ATTACHING AN EXTERNAL LOAD AND WITH FASTENER MEANS FOR FASTENING SAID ATTACHMENT MEANS TO AN AIRCRAFT, AN ASSOCIATED AIRCRAFT, AND AN ASSOCIATED METHOD

CROSS REFERENCE TO RELATED APPLICATION

This application claims priority to FR 11 00243 filed on Jan. 27, 2011, the disclosure of which is incorporated in its entirety by reference herein.

BACKGROUND OF THE INVENTION (1) Field of the Invention

The present invention relates to a removable fastener device equipped with attachment means for attaching an external load and with fastener means for fastening said attachment means to an aircraft, and also relates to an aircraft equipped with such a device and to an associated method.

The technical field of the invention is thus the field of fastener devices for fastening an external load to an aircraft, and in particular to a rotary-wing aircraft.

(2) Description of Related Art

Conventionally, an aircraft has a structure, referred to by convenience as a "load-carrier" structure, for carrying optional equipment, it being possible for said load-carrier structure to be the fuselage of the aircraft or a sponson, for example. The aircraft can then be provided with a removable fastener device for removably fastening an external load, which fastener device comprises attachment means and fastener means for fastening the attachment means under the load-carrier structure.

By way of example, the attachment means may be attachment means of the release hook type, that may be mounted to swivel or not to swivel and that is fastened to the load-carrier structure of the rotorcraft by fastener means. A sling is then attached to the release hook in order to enable it to carry heavy external loads.

The fastener means for fastening such a release hook may comprise:

first means of the universal joint type having two mutually orthogonal pivot axes and referred to as a "sling-ring";

second means sometimes referred as a "swing", said second means comprising a frame suspended from the load-carrier structure, e.g. by four suspension cables;

third means implementing a beam to which the equipment is fastened, the beam generally being fastened at two points to the load-carrier structure; and fourth means implementing a boom fastened to the main power transmission gearbox of the rotorcraft, an equipment being hinged to said boom.

In addition, since the attachment means project from the load-carrier structure, it is appropriate to provide protection in the event of a crash, in particular so as to avoid the removable device and rotably the attachment means damaging the load-carrier structure.

In addition, it can be understood that, in flight, the fastener means and the attachment means together generate aerodynamic drag tending to be detrimental to the speed of the aircraft or to the in-flight fuel consumption of said aircraft. Such disruptive aerodynamic drag is even more of a hindrance while no external load is being carried by said attachment means.

The state of the art includes, in particular Document U.S. Pat. No. 5,850,991, Document U.S. Pat. No. 4,138,078, Document GB 890 178, and Document FR 1 379 420.

Document U.S. Pat. No. 5,850,991 presents a removable device comprising attachment means and fastener means for fastening the equipment, namely respectively a release hook fastened to a beam via a hinge.

The beam is hinged inside a box in order to enable the removable device to be masked inside said box. In a deployed first position, the release hook makes it possible to secure a load. Conversely, in a pivoted second position, the device is contained entirely within the box so that it does not project from the load-carrier structure of the aircraft while being held by dedicated means.

Document U.S. Pat. No. 4,138,078 presents guide means for guiding a release hook carrying a load.

Document GB 890 178 shows a release hook fastened under an aircraft by bars hinged to a load-carrier structure.

Document FR 1 379 420 presents a set of fastenings, each one of which can be lowered or raised independently.

Document U.S. Pat. No. 3,044,818, and Document U.S. Pat. No. 5,499,785 are also known.

BRIEF SUMMARY OF THE INVENTION

An object of the invention is therefore to propose a fastener device provided with attachment means and with fastener means for fastening the attachment means under a load-carrier structure of an aircraft, which fastener device makes it possible at least to limit the risk of damage to the load-carrier structure caused by the fastener device in the event that the aircraft crashes, and at least to limit its aerodynamic drag when the attachment means are not carrying any load.

The invention provides a fastener device provided with attachment means for attaching an external load and with fastener means for fastening the attachment means to a load-carrier structure of an aircraft, the fastener means being provided with a support beam and with anchor means for anchoring the support beam to a load-carrier structure.

In addition, the fastener device includes:

a first mechanical coupling connecting the support beam to the anchor means so as to enable the support beam to pivot about a first pivot axis;

coupling means hinged by a second mechanical coupling to the support beam so as to enable the support beam to pivot relative to the coupling means about a second pivot axis parallel to the first pivot axis, a third mechanical coupling hinging the attachment means to the coupling means to enable the attachment means to pivot relative to the coupling means about a third pivot axis parallel to the first pivot axis;

with the support beam and the fastener means being aligned in an unfolded position obtained automatically when the attachment means are carrying an external load, the fastener device includes automatic folding means for acting in the absence of a predetermined force exerted by a load on the attachment means to constrain the support beam to pivot relative to a load-carrier structure in a first direction, and constraining the attachment means to pivot relative to the coupling means in a second direction opposite from the first direction.

Thus, when an external load of weight greater than a given threshold weight is attached to the attachment means, said external load exerts a force greater than or equal to said predetermined force along an elevation axis. The fastener device then finds itself in an unfolded position along a given axis and projects from the load-carrier structure over a first distance.

Conversely, in the absence of such an external load, the automatic folding means maintains the fastener device in a folded position, the fastener device being folded up so that it projects from the load-carrier structure over a reduced second distance, less than said first distance.

The ground clearance between the attachment means and the ground is thus minimized. During a crash, the probability of there being contact between the attachment means and the ground that might damage the load-carrier structure is thus reduced or indeed zero.

Similarly, in flight, the aerodynamic drag of the fastener device is reduced in the absence of external load.

Thus the invention proposes a simple fastener device that does not need a box for receiving the device to be implemented in the load-carrier structure, but that does, nevertheless, generate limited aerodynamic drag, and that presents reduced danger for the load-carrier structure in the event of a crash.

In addition, this fastener device may have one or more of the following additional characteristics.

For example, the support beam may be contained in a first plane parallel to a second plane containing the attachment means when said fastener device is in a folded position. This characteristic makes it possible to obtain advantageous compactness in the folded position.

In addition, the attachment means may be chosen from a list containing a release hook, a sling hook, and a fastener. When a fastener is used, it may optionally make it possible to fasten a searchlight under the load-carrier structure.

In addition, the fastener device advantageously has at least one stop means for stopping a moving member of said fastener device, to be chosen from the following selection:

a first abutment for limiting the freedom of pivoting movement of the coupling means relative to said support beam;

a second abutment for limiting the freedom of pivoting movement of the attachment means relative to the coupling means; and a third abutment for limiting the freedom of pivoting movement of the support beam relative to the anchor means.

It should be noted that the abutments may be rigid abutments or flexible abutments, e.g. of the shock-absorber type.

In another aspect, the automatic folding means comprise return means for urging the support beam to pivot at a first pivot speed, and a return member for constraining the attachment means to pivot at a second pivot speed less than the first pivot speed.

The fastener device then folds under conditions that are clearly defined, e.g. so as to avoid the fastener device jamming.

In another aspect, the first mechanical coupling may comprise firstly a first fastener member co-operating with a first end of the support beam and with a first anchor member of the anchor means, and secondly a second fastener member co-operating with a second end of the support beam and with a second anchor member of the anchor means, at least one fastener member including return means of the automatic folding means for the purpose of urging the support beam to pivot in the absence of said predetermined force.

The return means may optionally comprise at least one of the following elements: at least one torsion spring, and a pressurized-fluid first link.

As a result, the first mechanical coupling causes the support beam to pivot in the absence of any external load carried by the attachment means.

In a variant, at least one of the two fastener members making it possible to attach the support member to the anchor members comprises a torsion spring. The torsion spring naturally tends to constrain the support beam to pivot to bring the fastener device into the folded position.

In another variant, at least one fastener member comprises a lever hinged to a pressurized-fluid first link. When an external load is attached to the attachment means, the pressurized-fluid first link lengthens, the pressure of the fluid in said pressurized-fluid first link not being sufficient to retract the pressurized-fluid first link.

Conversely, in the absence of said external load, the pressurized-fluid first link retracts.

In addition, the coupling means may optionally comprise a first coupling link and a second coupling link that are hinged to the support beam respectively via a first fastener pin and via a second fastener pin of the second mechanical coupling, each coupling link having hinge means of the third mechanical coupling for jointly carrying the attachment means.

The coupling means are then simple means allowing the constrained pivoting of the support beam and of the attachment means to take place.

In addition, the automatic folding means may include at least one return member for constraining the attachment means to pivot relative to the coupling means in a second direction in the absence of said predetermined force.

In an embodiment, a return member comprises a torsion spring co-operating with the coupling means and with the attachment means.

In an alternative embodiment, a return member further comprises a pressurized-fluid second link fastened to the support beam, each pressurized-fluid second link being connected via an elongate element to a roller of the third coupling means that is secured to the attachment means.

In the absence of an external load, each pressurized-fluid second link retracts. The pressurized-fluid second link then moves the elongate element closer to the support beam. Said elongate element thus exerts a traction force on the roller, thereby causing the attachment means to pivot about the third pivot axis.

Each roller may then be a cylinder of varying radius provided with at least a first radius and a second radius, the elongate element being in contact with the first radius during a first folding stage, and with the second radius during a second folding stage, the first radius being less than said second radius. As a function of the folding stage, the attachment means then pivot at different pivot speeds.

The roller may be in the shape of a drop of water, or indeed may be elliptical in shape, for example.

In another aspect, the invention provides an aircraft provided with the fastener device having one or more of the above-mentioned characteristics.

This aircraft is then provided with a load-carrier structure extending longitudinally from a front end to a rear end and laterally from a first side to a second side, the aircraft having a fastener device provided with attachment means and with fastener means for fastening the attachment means to the load-carrier structure.

The aircraft is then remarkable, in particular, in that, with said fastener device being of the type described above, the fastener means are provided with a support beam and with anchor means for anchoring the support beam to a load-carrier structure, the fastener means comprising:

a first mechanical coupling connecting the support beam to the anchor means so as to enable the support beam to pivot about a first pivot axis relative to the load-carrier structure;

coupling means hinged by a second mechanical coupling to the support beam so as to enable the support beam to pivot relative to the coupling means about a second pivot axis parallel to the first pivot axis, a third mechanical coupling hinging the attachment means to the coupling means to enable the attachment means to pivot relative to the coupling means about a third pivot axis parallel to the first pivot axis;

with the support beam and the fastener means being aligned in an unfolded position obtained automatically when the attachment means are carrying an external load, the fastener device includes automatic folding means for acting in the absence of a predetermined force exerted by a load on the attachment means to constrain the support beam to pivot in a first direction relative to a load-carrier structure, and constraining the attachment means to pivot relative to the coupling means in a second direction opposite from the first direction, said support beam being contained in a first plane parallel to a second plane containing the attachment means in a folded position.

In addition, the invention also provides a method of optimizing the overall size and the aerodynamic drag of a fastener device of the type described above, provided in particular with anchor means, with a support beam, with coupling means, and with attachment means.

During this method, with the support beam and the attachment means being aligned in an unfolded position when the attachment means are carrying an external load of weight greater than a given threshold weight, in the absence of the external load the support beam is pivoted in a first direction at a first pivot speed, and the attachment means are pivoted in a second direction at a second pivot speed less than the first pivot speed, the first direction being opposite from the second direction.

For example:

during a first stage, the support beam, the coupling means, and the attachment means are pivoted simultaneously until the coupling means reach a first abutment;

during a second stage, the support beam and the attachment means are pivoted simultaneously until the attachment means reach a second abutment; and during a third stage, the support beam is pivoted until said support beam reaches a third abutment.

BRIEF DESCRIPTION OF THE SEVERAL VIEWS OF THE DRAWINGS

The invention and its advantages appear in more detail from the following description of embodiments given by way of illustration and with reference to the accompanying figures, in which.

Elements that are present in more than one figure are given the same references in each of them.

DETAILED DESCRIPTION OF THE INVENTION

Figure 1:
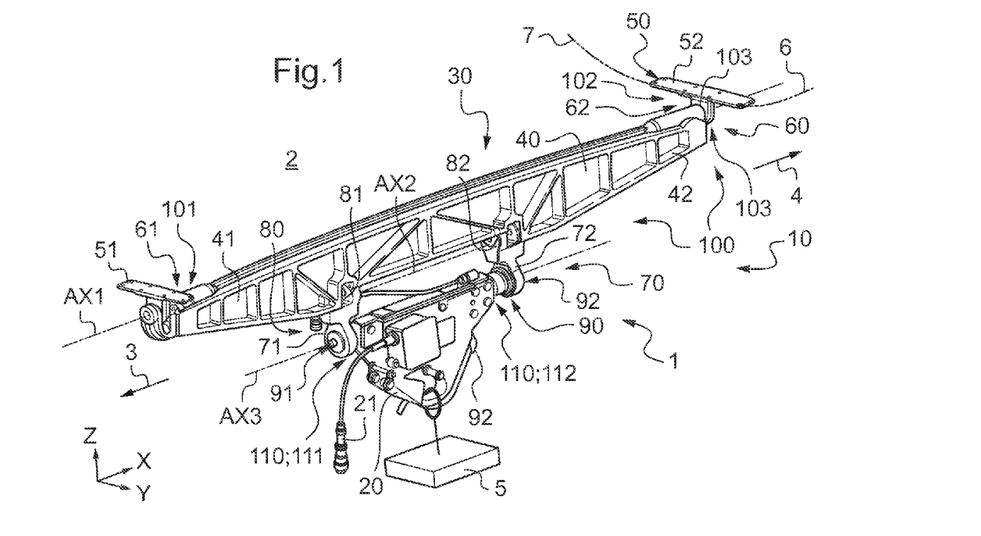
FIGS. 1 and 2 are views of a first embodiment in the unfolded position.
Figure 2:
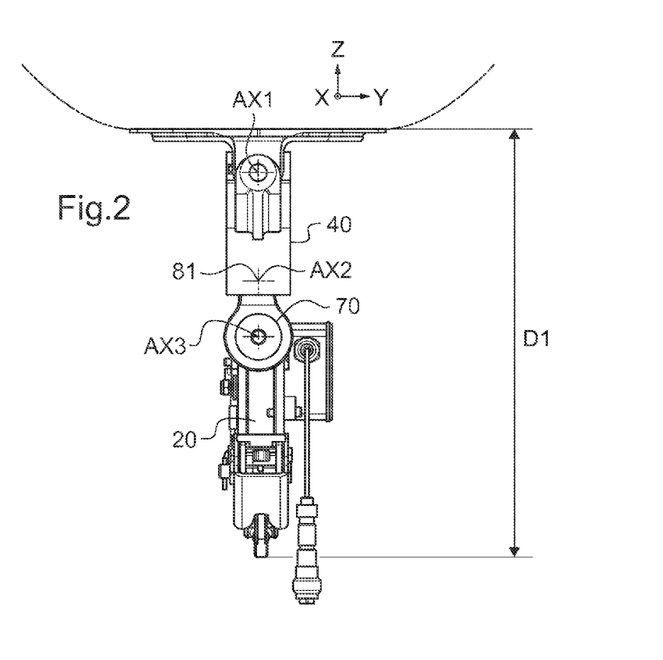

Three axes that are mutually orthogonal are referenced X, Y, and Z and are shown in FIGS. 1 and 2.

The axis X is said to be "longitudinal" insofar as the aircraft presented extends longitudinally along this axis. The term "longitudinal" is used relative to this longitudinal axis X. The longitudinal axis X is at least parallel to the roll axis of the aircraft.

Another axis Y is said to be the "transverse" axis. The term "transverse" is used relative to this transverse axis Y. The transverse axis Y is at least parallel to the pitch axis of the aircraft.

Finally, a third axis Z is said to be the "elevation" axis. The elevation axis Z is at least parallel to the yaw axis of the aircraft.

FIGS. 1 to 11 show preferred embodiments of the invention.

Independently of the embodiment, and with reference to FIG. 1, an aircraft 1 has a load-carrier structure 2. This load-carrier structure extends longitudinally along an axis parallel to the longitudinal axis X from a front end 3 to a rear end 4, and transversely along an axis parallel to the transverse axis Y, from a first side 6 to a second side 7.

The load-carrier structure 2 is advantageously constituted by the fuselage of the aircraft, but it may optionally be constituted by a carrier arm, or indeed by a wing or a sponson, for example.

The aircraft 1 is equipped with a fastener device 10 for carrying an external load 5, namely a load that is not part of the aircraft 1.

The fastener device 10 then comprises attachment means 20 for carrying the external load 5, and fastener means 30 for fastening the attachment means 20 under a load-carrier structure 2 of the aircraft 1.

The attachment means 20 may be constituted by a release hook of the type described in the prior art. It should be noted that FIGS. 1 to 6 and 11 show an electrical harness 21 for connecting control means for controlling the release hook. For reasons of convenience and so as not to overcrowd the figures, the electrical harness that is shown is not connected to its control means. Reference can be made to the literature for further information about a release hook. The attachment means 20 may also be a sling hook or more generally any fastener device, e.g. for attaching a searchlight.

In addition, the fastener means 30 are provided with a support beam 40 that is removably fastened to the load-carrier structure 2 by anchor means 50, a first mechanical coupling 60, e.g. of the pivot coupling type, connecting the support beam 40 to the anchor means.

A particular function of this first mechanical coupling 60 is to allow the support beam freedom to pivot about a first pivot axis AX1. The first mechanical coupling 60 then enables the support beam to pivot about said first pivot axis AX1. The way in which such pivoting movement is caused by folding means 100 or by the external load is explained below.

In the fastener means shown, the anchor means 50 include a first anchor member 51 and a second anchor member 52 fastened to the load-carrier structure 2, e.g. by bolts.

With the support beam 40 extending from a first end 41 towards a second end 42, the first mechanical coupling 60 is provided firstly with a first fastener member 61 co-operating with the first anchor member 51 and with the first end 41, and secondly with a second fastener member 62 co-operating with the second anchor member 52 and with the second end 42.

Each fastener member may include a coupling pin inserted into an orifice in the corresponding anchor means, and fastener elements for fastening said coupling pin to the support beam 40. The coupling pins of the fastener member are then disposed along the first pivot axis AX1. Each fastener member may include bearings (not shown).

In another aspect, the fastener device 10 is provided with coupling means 70 interconnecting the support beam 40 and the attachment means 20, the coupling means 70 making it possible to attach the attachment means 20 to the support beam 40.

The coupling means 70 are then firstly hinged to the support beam by a second mechanical coupling 80, e.g. of the pivot coupling type, and secondly hinged to the attachment means 20 by a third mechanical coupling 90, e.g. of the pivot coupling type.

A particular function of the second mechanical coupling 80 of the pivot coupling type is to allow the support beam freedom to pivot relative to the coupling means about a second pivot axis AX2. The second mechanical coupling 80 then enables the support beam to pivot about the second pivot axis AX2 relative to the coupling means 70.

Similarly, a particular function of the third mechanical means 80 is to allow the attachment means freedom to pivot relative to the coupling means about a third pivot axis AX3. The third mechanical coupling 90 then enables the attachment means to pivot about the third pivot axis AX3 relative to the coupling means 60.

The first, second and third pivot axes AX1, AX2, AX3 presented are parallel in pairs. In addition, the first, second and third pivot axes AX1, AX2, AX3 may extend longitudinally, or indeed transversely.

For example, the coupling means comprise a first coupling link 71 and a second coupling link 72 that are hinged to the support beam 40 respectively by a first fastener pin 81 and by a second fastener pin 82 of the second mechanical coupling 80, such as fastener pins of any usual type.

In addition, each coupling link 71, 72 is provided with hinge means 91, 92 of the third mechanical coupling 90 so as to carry the attachment means 20 jointly. Each hinge means may have a hinge pin secured to or integral with the attachment means 20 and passing through an orifice in a coupling link.

It should be noted that the first coupling link 71 and the second coupling link 72 may be secured together or indeed made in one piece with each other so as to ensure that the hinge means 91, 92 are aligned.

In addition, the fastener means include automatic folding means 100 for constraining the fastener device 10 to fold into a folded position in the absence of an external load 5, and for allowing the fastener device 10 to unfold into an unfolded position when the attachment means 20 support an external load 5.

With reference to FIGS. 1 and 2, when an external load 5 that has a weight greater than a given threshold weight is attached to the attachment means 20, said external load exerts a force on the fastener device 10 that is greater than or equal to a predetermined force.

The support beam 40, the coupling means 70 and the attachment means are then aligned. With reference to FIG. 2, it should be noted that, in this unfolded position, the fastener device projects from the load-carrier structure over a first distance D1.

Figure 3:
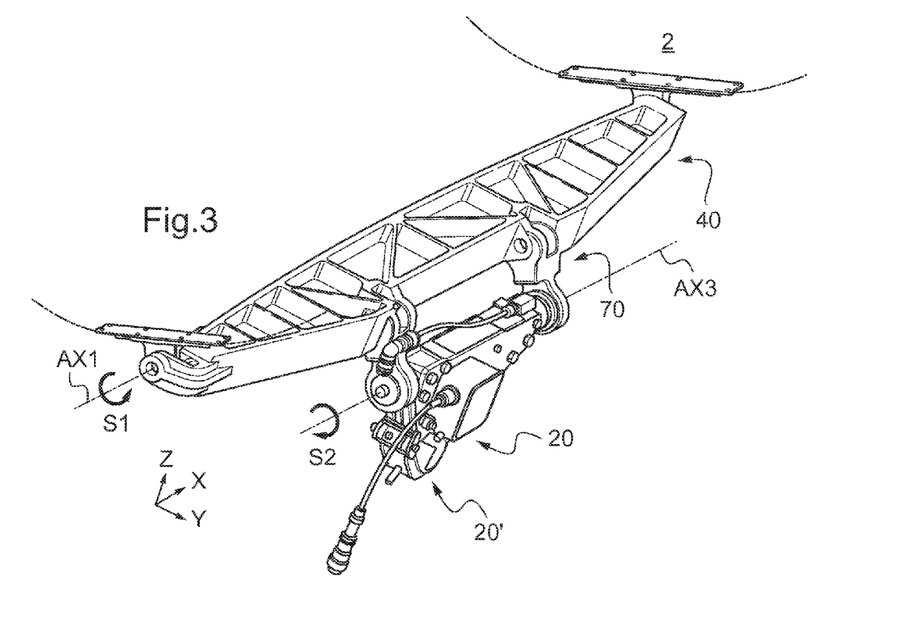
FIGS. 3 and 4 are views of a first embodiment during a folding stage.
Figure 4:
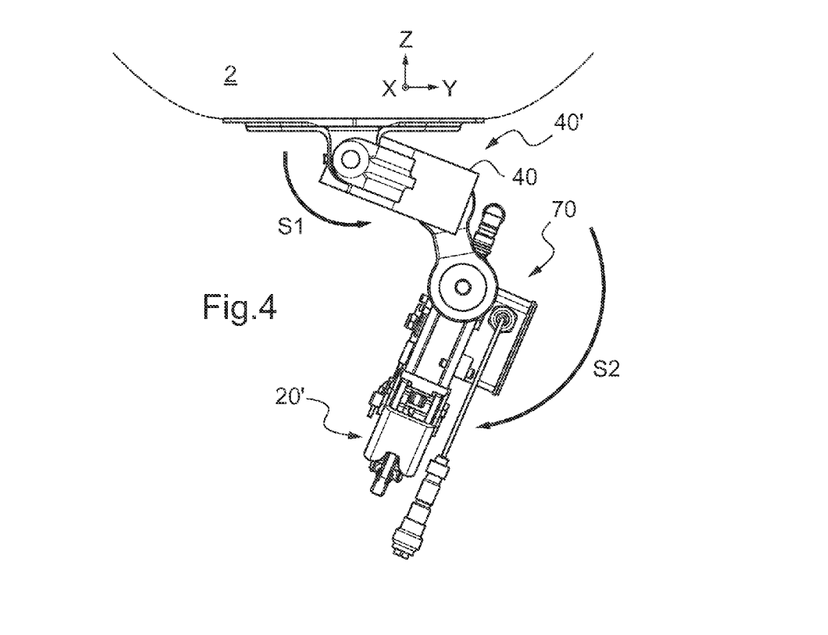

When the external load 5 is detached, the fastener device 10 is no longer subjected to a force greater than or equal to a predetermined force. With reference to FIGS. 3 and 4 the folding means 100 then automatically constrain the support beam 40 to pivot in a first direction S1 about the first pivot axis AX1, and automatically constrain the attachment means 20 to pivot in a second direction S2 opposite from the first direction S1 about the third pivot axis AX3. The coupling means remain substantially in the same position but move closer to the load-carrier structure.

As a result, the portion 40' of the support beam 40 connected to the coupling means 70 and the portion 20' of the attachment means 20 connected to the coupling means 70 move closer to the load-carrier structure 2.

It should be noted that, in one method, the folding means 100 may pivot the support beam 40 in a first direction S1 at a first pivot speed and may pivot the attachment means 20 in a second direction S2 opposite from the first direction S1 at a second pivot speed that is less than said first pivot speed.

In addition, in the linkage shown in FIGS. 3 to 4, the coupling means remain substantially in the same position while moving closer to the load-carrier structure. However, it can be understood that these coupling means may optionally pivot relative to the support beam.

In addition, it is possible to implement stop means that are not shown in the figures, and that comprise:

at least one first abutment for limiting any freedom of pivoting movement of the coupling means relative to the support beam; and/or at least one second abutment for limiting the freedom of pivoting movement of the attachment means relative to the coupling means; and/or at least one third abutment for limiting the freedom of pivoting movement of the coupling support beam relative to the anchor means.

Figure 5:
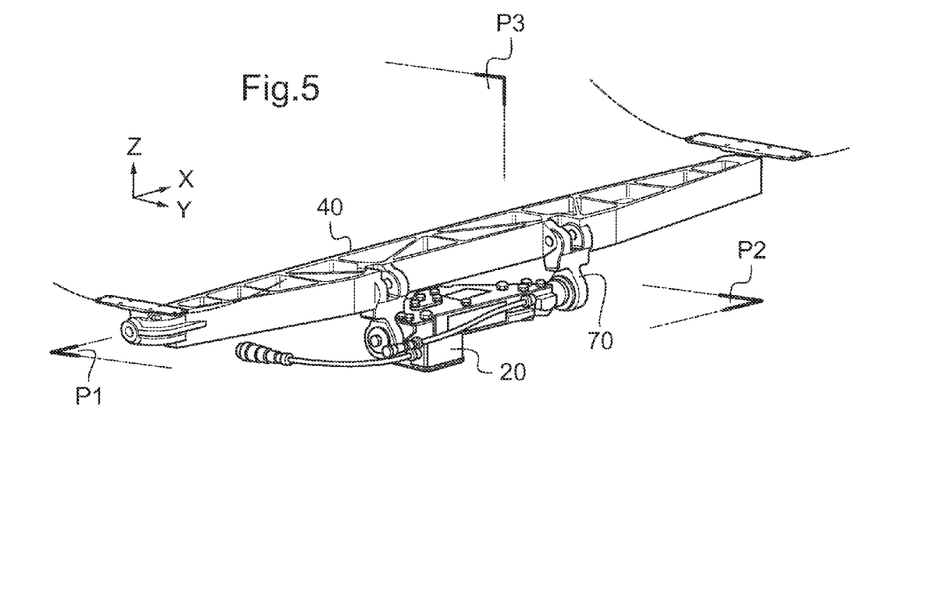
FIGS. 5 and 6 are views of a first embodiment in the folded position.
Figure 6:
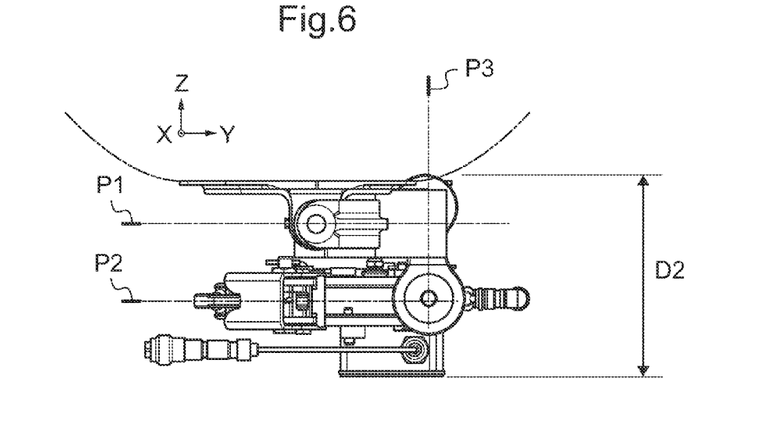

With reference to FIGS. 5 and 6, after the folding, the fastener device finds itself in a folded position.

In the example shown, the support beam is then arranged in a first plane P1 parallel to a second plane P2 containing the attachment means 20. Conversely, the coupling means 70 are contained in a third plane P3 that is substantially orthogonal to the first plane P1 and to the second plane P2.

In addition, the fastener device projects from the load-carrier structure over a second distance D2 less than the above-mentioned first distance D1.

Starting from this folded position, when an external load 5 of weight greater than a given threshold weight is attached to the attachment means 20, said external load exerts a force greater than or equal to said predetermined force along an elevation axis. The folding means 100 cannot then remain in the folded position. The fastener device thus goes into the above-mentioned unfolded position.

In addition, in order to urge the fastener device to fold, at least one fastener member 61, 62 includes return means 101, 102 of the automatic folding means 100 for the purpose of urging said support beam 40 to pivot when said support beam is subjected to a traction force less than a predetermined force, namely to a traction force resulting solely from the weight of the coupling means and of the attachment means.

Each return means co-operates firstly with the support beam and secondly with a member that is stationary in rotation relative to said support beam, which member may, for example, be the anchor means 50 or the load-carrier structure.

Thus, the first fastener member 61 and the second fastener member 62 may each be provided with respective return means.

Similarly, the automatic folding means 100 include at least one return member 110 co-operating with the attachment means for constraining the attachment means 20 to pivot relative to the coupling means 70 in a second direction S2 when the attachment means are subjected to a traction force less than a predetermined force, namely a traction force resulting solely from the weight of the attachment means.

The return means and the return member are set so that they impart predetermined pivot speeds to the associated elements.

In the first embodiment shown in FIG. 1, at least one return means 101, 102 is constituted by a torsion spring 103 connecting the support beam 40 to the anchor means, said torsion spring urging the support beam 40 to move closer to the load-carrier structure 2.

For example, the first fastener member 61 includes a first torsion spring in engagement with the first end 41 of the support beam 40 and with the first anchor member 51, the second fastener member 62 including a second torsion spring in engagement with the second end 42 of the support beam 40 and with the second anchor member 52.

Similarly, each return member 110 comprises at least one torsion spring interconnecting the attachment means 20 and the coupling means 70, said torsion spring of the return member urging the attachment means 20 to move closer to the support beam 40 and to the load-carrier structure 2.

For example, a first return member 110 comprises a first torsion spring 111 in engagement with a first end zone of the attachment means 20 and with the first coupling link 71. In addition, a second return member 110 may comprise a second torsion spring 112 in engagement with a second end zone of the attachment means 20 and with the second coupling link 72.

Figure 7:
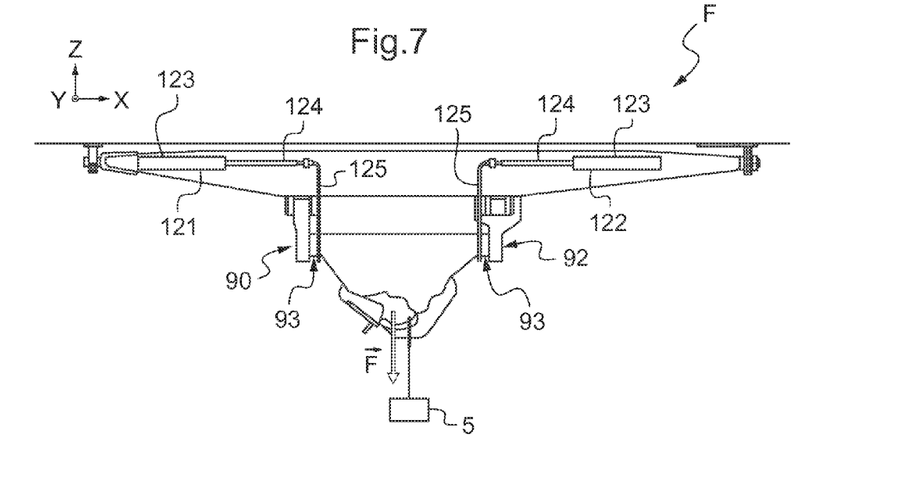
FIGS. 7 to 10 are views of a second embodiment in the folded position.
Figure 8:
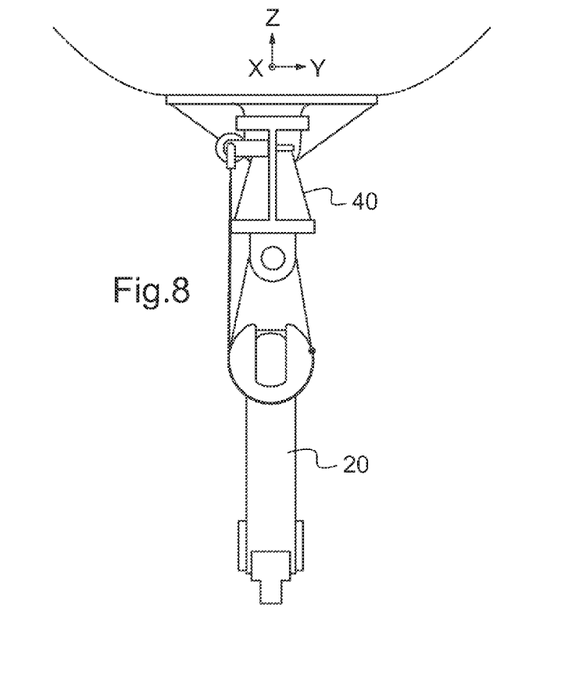

In the second embodiment shown in FIG. 7, at least one return means 101, 102 is constituted by a torsion spring connecting the support beam 40 to the anchor means. For example, two return means of the torsion spring type co-operate with the support beam, as in the first embodiment shown diagrammatically.

However, each return member comprises a pressurized-fluid second link 121, 122 fastened to the support beam 40, e.g. along a longitudinal axis.

Each pressurized-fluid second link comprises a first body 123 and a second body 124. A pressurized fluid, e.g. a gas or a liquid, is inserted between the first body 123 and the second body 124.

The first body 123 of a pressurized-fluid second link is connected to a distinct element of the attachment means, namely the load-carrier structure 2 or the support beam in the preferred variant of FIG. 7. The second body 124 is then connected, via an elongate element 125 of the cable type or of some equivalent type, to a roller 93 of the third coupling means 90, each roller 93 being constrained in rotation with the attachment means 20 about the third pivot axis AX3.

The rollers presented are cylinders of constant radius. However, each roller may have a complex shape, e.g. by being in the shape of a cylinder of varying radius, e.g. of a cylinder having elliptical bases.

When an external load 5 is attached to the attachment means 20, said external load 5 exerts a force F on the fastener device 10. Since this force is greater than a predetermined force corresponding to the pressure of the fluid in the pressurized-fluid second links, each pressurized-fluid second link lengthens, with the bodies of each pressurized-fluid second link moving apart from each other.

As a result, the attachment means 20 pivot relative to the coupling means 70. In parallel, the support beam pivots about the first pivot axis AX1.

The fastener device is then in the unfolded position shown in FIG. 7.

Figure 9:
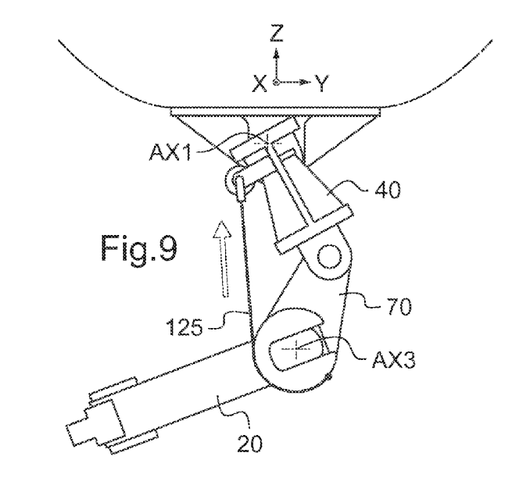

With reference to FIG. 9, after the external load has been released, the pressure of the fluid in each pressurized-fluid second link tends to retract said pressurized-fluid second link, one of the bodies of the pressurized-fluid second link sliding inside the other body of the pressurized-fluid second link.

The elongate elements 125 are then moved by the pressurized-fluid second links as indicated by arrow F1. Since each elongate element 125 is secured to a roller 93 fastened to the attachment means 20, the attachment means are then caused to pivot about the third pivot axis AX3.

In parallel, the support beam pivots about the first pivot axis AX1 under the effect of the return means.

It should be noted that the coupling means 70 may either remain in an unchanged position while moving closer to the load-carrier structure, or pivot under the effect of the combined movement of the support beam and of the attachment means as shown in FIG. 9. The third pivot speed at which the coupling means pivot relative to the support beam is, for example, greater than the first pivot speed at which the support beam pivots relative to the anchor means.

Figures 10, 11:
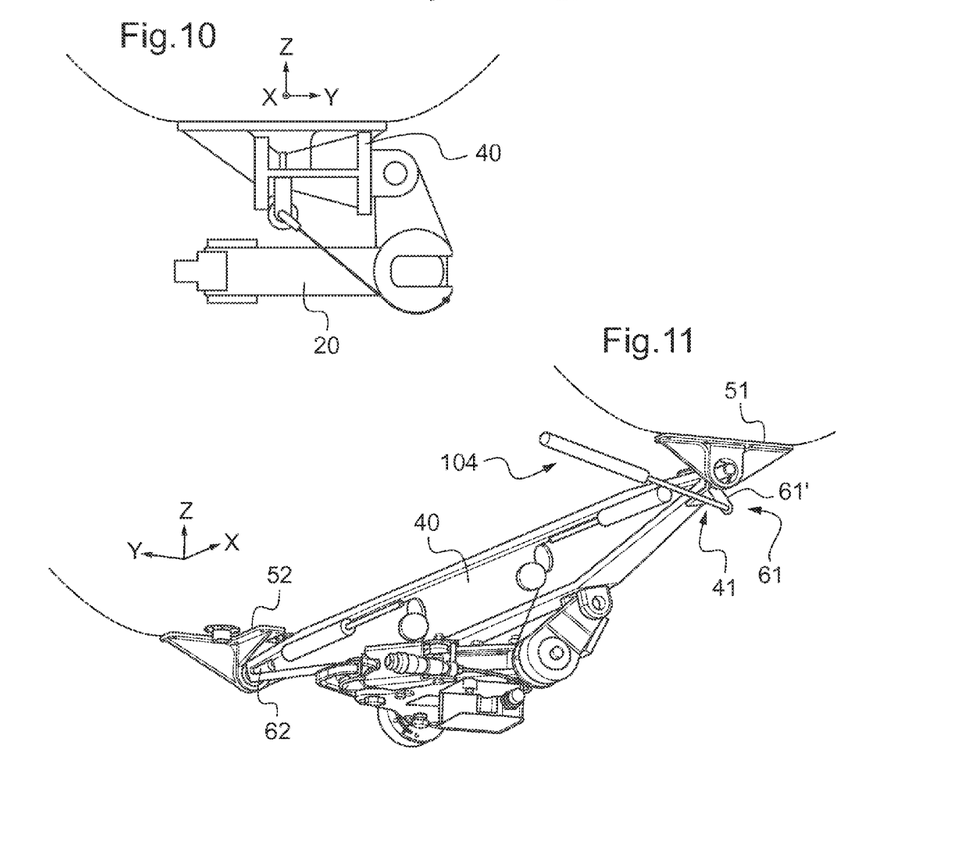
FIG. 11 is a view of a third embodiment.

With reference to FIG. 10, after the support beam 40 and the attachment means 20 have pivoted, the fastener device 10 finds itself in a folded position.

The third embodiment shown in FIG. 11 differs from the second embodiment by the presence of return means not provided with a torsion spring but rather with a pressurized-fluid first link 104 hinged to a lever of a fastener member.

Finally, it can be understood that it is also possible to combine a return member of the torsion spring type with return means of the pressurized-fluid second link type, for example. Similarly, when two return means are used, said two return means may be of distinct types. Similarly, if two return members are implemented, said two return members may be of distinct types.

Naturally, the present invention may be subject to numerous variations as to its implementation. Although several embodiments are described, it can readily be understood that it is not conceivable to identify exhaustively all possible embodiments. It is naturally possible to replace any of the means described with equivalent means without going beyond the ambit of the present invention.

What is claimed is:

1. A fastener device provided with attachment means for attaching an external load and with fastener means fastening the attachment means to a load-carrier structure of an aircraft, said fastener means being provided with a support beam and with anchor means anchoring said support beam to a load-carrier structure,
   wherein said fastener device includes:
      a first mechanical coupling connecting said support beam to the anchor means so as to enable the support beam to pivot about a first pivot axis (AX1); and
      coupling means hinged by a second mechanical coupling to the support beam so as to enable the support beam to pivot relative to the coupling means about a second pivot axis (AX2) parallel to the first pivot axis (AX1), a third mechanical coupling hinging the attachment means to the coupling means to enable the attachment means to pivot relative to the coupling means about a third pivot axis (AX3) parallel to the first pivot axis (AX1);
   with said support beam and the fastener means being aligned in an unfolded position obtained automatically when the attachment means are carrying an external load, said fastener device includes automatic folding means for acting in the absence of a predetermined force exerted by a load on the attachment means to constrain the support beam to pivot relative to a load-carrier structure in a first direction (S1), and constraining the attachment means to pivot relative to the coupling means in a second direction (S2) opposite from the first direction (S1).

2. The fastener device according to claim 1, wherein said support beam is contained in a first plane (P1) parallel to a second plane (P2) containing the attachment means when said fastener device is in a folded position.

3. The fastener device according to claim 1, wherein said attachment means are chosen from a list containing a release hook, a sling hook, and a fastener.

4. The fastener device according to claim 1, having at least one stop means chosen from the following selection:
- a first abutment for limiting the freedom of pivoting movement of the coupling means relative to said support beam;
- a second abutment for limiting the freedom of pivoting movement of the attachment means relative to the coupling means; and
- a third abutment for limiting the freedom of pivoting movement of the support beam relative to the anchor means.

5. The fastener device according to claim 1, wherein said automatic folding means comprise return means for urging said support beam to pivot at a first pivot speed, and a return member for constraining the attachment means to pivot at a second pivot speed less than said first pivot speed.

6. The fastener device according to claim 1, wherein said first mechanical coupling comprises firstly a first fastener member co-operating with a first end of the support beam and with a first anchor member of the anchor means, and secondly a second fastener member co-operating with a second end of the support beam and with a second anchor member of the anchor means, at least one fastener member including return means of the automatic folding means urging said support beam to pivot in the absence of said predetermined force.

7. The fastener device according to claim 1, wherein said automatic folding means comprise at least one of the following elements: at least one torsion spring, and a pressurized-fluid first link.

8. The fastener device according to claim 1, wherein said coupling means comprise a first coupling link and a second coupling link that are hinged to the support beam respectively via a first fastener pin and via a second fastener pin of the second mechanical coupling, each coupling link having hinge means of the third mechanical coupling for jointly carrying the attachment means.

9. The fastener device according to claim 1, wherein said automatic folding means include at least one return member for constraining the attachment means to pivot relative to the coupling means in a second direction (S2) in the absence of said predetermined force.

10. The fastener device according to claim 9, wherein said return member comprises a torsion spring co-operating with the coupling means and with the attachment means.

11. The fastener device according to claim 9, wherein said return member further comprises a pressurized-fluid second link fastened to the support beam, each pressurized-fluid second link being connected via an elongate element to a roller of the third mechanical coupling that is secured to the attachment means.

12. The fastener device according to claim 11, wherein said roller is a cylinder of varying radius provided with at least a first radius and a second radius, the elongate element being in contact with said first radius during a first folding stage, and with said second radius during a second folding stage, said first radius being less than said second radius.

13. An aircraft provided with a load-carrier structure extending longitudinally from a front end to a rear end and laterally from a first side to a second side, said aircraft having a fastener device provided with attachment means and with fastener means for fastening the attachment means to said load-carrier structure,
wherein, with said fastener device being according to claim 1, said fastener means are provided with a support beam and with anchor means for anchoring said support beam to a load-carrier structure, the fastener means comprising:
- a first mechanical coupling connecting said support beam to the anchor means so as to enable the support beam to pivot about a first pivot axis (AX1) relative to the load-carrier structure;
- coupling means hinged by a second mechanical coupling to said support beam so as to enable the support beam to pivot relative to the coupling means about a second pivot axis (AX2) parallel to the first pivot axis (AX1), a third mechanical coupling hinging the attachment means to the coupling means to enable the attachment means to pivot relative to the coupling means about a third pivot axis (AX3) parallel to the first pivot axis (AX1);
- with said support beam and the fastener means being aligned in an unfolded position obtained automatically when the attachment means are carrying an external load, said fastener device includes automatic folding means for acting in the absence of a predetermined force exerted by a load on the attachment means to constrain the support beam to pivot in a first direction (S1) relative to a load-carrier structure, and constraining the attachment means to pivot relative to the coupling means in a second direction (S2) opposite from the first direction (S1), said support beam (40) being contained in a first plane (P1) parallel to a second plane (P2) containing the attachment means in a folded position.

14. A method of optimizing the overall size and the aerodynamic drag of a fastener device according to claim 1, provided with anchor means, with a support beam, with coupling means, and with attachment means,
during which method, with said support beam and the attachment means being aligned in an unfolded position when the attachment means are carrying an external load of weight greater than a given threshold weight with the attachment means projecting a first distance from the anchor means, in the absence of said external load the support beam is pivoted in a first direction (S1) at a first pivot speed, and the attachment means are pivoted in a second direction (S2) opposite from the first direction (S1) at a second pivot speed less than said first pivot speed until the attachment means project a second distance from the anchor means, the second distance being less than the first distance, presenting a reduced fastener profile.

15. The method according to claim 14, wherein:
during a first stage, the support beam, the coupling means, and the attachment means are pivoted simultaneously until said coupling means reach a first abutment;
during a second stage, the support beam and the attachment means are pivoted simultaneously until said attachment means reach a second abutment; and
during a third stage, the support beam is pivoted until said support beam reaches a third abutment.

16. An aircraft including:
a frame having a lower portion; and
a fastener device coupled with and extending from the lower portion via spaced first and second connection points, the fastener device including:
an elongate beam having a first beam end and an opposing second beam end, the first beam end being pivotably connected to the first connection point and the second beam end being pivotably connected to the second connection point, defining a first pivot axis;

a coupler having a first coupler end and an opposing second coupler end, the first coupler end being pivotably connected to the elongate beam, defining a second pivot axis; and an attachment point being pivotably connected to the second coupler end, defining a third pivot axis, wherein the elongate beam, coupler, and attachment point are pivotable about the first, second, and third axes respectively defining an extended position and a folded position, the fastener device being biased toward the folded position, wherein in the extended position the first, second, and third axes are generally coplanar.

17. The aircraft of claim 16, wherein the fastener device is configured to, in response to the fastener device being in the folded position and a load being connected to the attachment point that exceeds a threshold load, move to the extended position, wherein moving to the extended position includes pivoting the elongate beam about the first axis in a first direction, pivoting the coupler about the second axis in a second direction, and pivoting the attachment point about the third axis in the second direction.

18. The aircraft of claim 16, wherein the fastener device includes a torsion spring or a pressurized fluid link exerting a biasing torque on the elongate beam, coupler, and attachment point.

19. An aircraft including:

a load-carrying structure having a lower portion; and a fastener device coupled with the lower portion via a connection point, the fastener device including:

an elongate beam having a first long side and an opposing second long side, the first side being pivotably connected to the connection point, defining a first pivot axis;

a coupler having a first end and a second end, the first end being pivotably connected to the second side, defining a second pivot axis; and an attachment point pivotably connected to the second end, defining a third pivot axis, wherein the elongate beam, coupler, and attachment point are pivotable about the first, second, and third axes respectively defining a first position with the attachment point displaced from the connection point a first distance and a second position with the attachment point displaced from the connection point a second distance, the second distance being less than the first distance, the fastener device being biased toward the second position.

20. The aircraft of claim 19, wherein the fastener device includes a torsion spring or a pressurized fluid link biasing the elongate beam, coupler, and attachment point toward the second position.

* * * * *